United States Patent
Onuki et al.

(10) Patent No.: US 7,407,298 B2
(45) Date of Patent: Aug. 5, 2008

(54) VEHICLE DOOR MIRROR WITH PULSE MODULATION CONTROL

(75) Inventors: Hiroyasu Onuki, Isehara (JP); Takashi Ogawa, Isehara (JP); Hajime Yagi, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 11/405,697

(22) Filed: Apr. 18, 2006

(65) Prior Publication Data

US 2006/0238907 A1 Oct. 26, 2006

(30) Foreign Application Priority Data

Apr. 19, 2005 (JP) .............................. 2005-121613
Dec. 21, 2005 (JP) .............................. 2005-367469

(51) Int. Cl.
 *B60R 1/074* (2006.01)
 *H02P 1/04* (2006.01)
(52) U.S. Cl. .................. 359/841; 359/843; 318/469
(58) Field of Classification Search ................. 359/877, 359/841, 843; 318/461, 465, 468–470
See application file for complete search history.

(56) References Cited

U.S. PATENT DOCUMENTS

| | | | | |
|---|---|---|---|---|
| 4,798,967 A * | 1/1989 | Yamana et al. ............. 307/10.1 |
| 5,319,881 A * | 6/1994 | Kuhlman ..................... 49/360 |
| 5,514,940 A * | 5/1996 | Okamoto ..................... 318/469 |
| 6,133,704 A * | 10/2000 | Yoshida et al. ............... 318/466 |
| 6,204,753 B1 * | 3/2001 | Schenk et al. ............... 340/435 |
| 6,838,850 B2 * | 1/2005 | Kurita et al. ................. 318/469 |
| 6,867,510 B2 * | 3/2005 | Kramer et al. ............. 307/10.1 |
| 2003/0026012 A1 * | 2/2003 | Pavao ......................... 359/872 |
| 2003/0034752 A1 * | 2/2003 | Kramer et al. ............... 318/560 |
| 2004/0227483 A1 * | 11/2004 | Katsumata et al. .......... 318/469 |
| 2005/0006955 A1 * | 1/2005 | Olijnyk ..................... 307/10.1 |

FOREIGN PATENT DOCUMENTS

| | | |
|---|---|---|
| JP | 1-122747 A | 5/1989 |
| JP | 2001-158296 A | 6/2001 |
| JP | 2001-171433 A | 6/2001 |
| JP | 2001158296 A * | 6/2001 |
| JP | 2004-182037 A | 7/2004 |

* cited by examiner

*Primary Examiner*—Alessandro Amari
*Assistant Examiner*—Mark Consilvio
(74) *Attorney, Agent, or Firm*—Foley & Lardner LLP

(57) ABSTRACT

A vehicle door mirror is configured to be mounted on outside of a vehicle in a retractable manner from a set position to a retracted position. When moving to the set position or the retracted position, the vehicle door mirror is moved at a first speed from a start position to a position right before a stop position, and is further moved from the position right before the stop position to the stop position at a second speed that is slower than the first speed.

8 Claims, 13 Drawing Sheets

DOOR MIRROR IN SET POSITION
($\theta = \theta_s$, $\phi = \phi_s$, $\theta_s > \phi_s$)

DOOR MIRROR IN SET POSITION

DOOR MIRROR IN RETRACTED POSITION

DOOR MIRROR IN SET POSITION ( $\theta = \theta_s$, $\phi = \phi_s$, $\theta_s > \phi_s$ )

DOOR MIRROR IN RETRACTED POSITION ( $\theta = \phi = \theta$ )

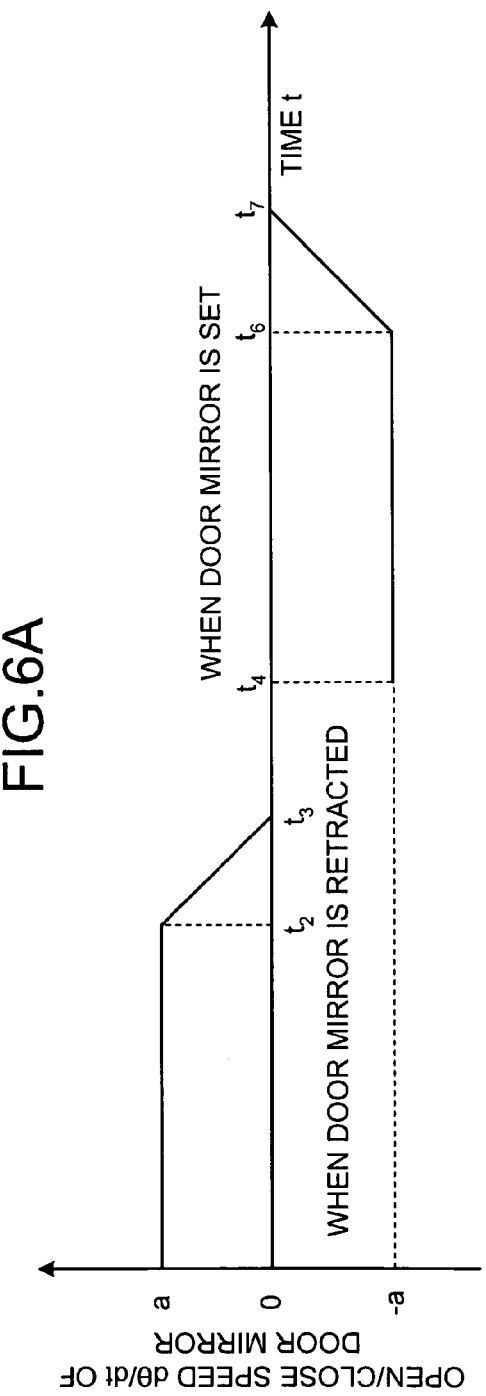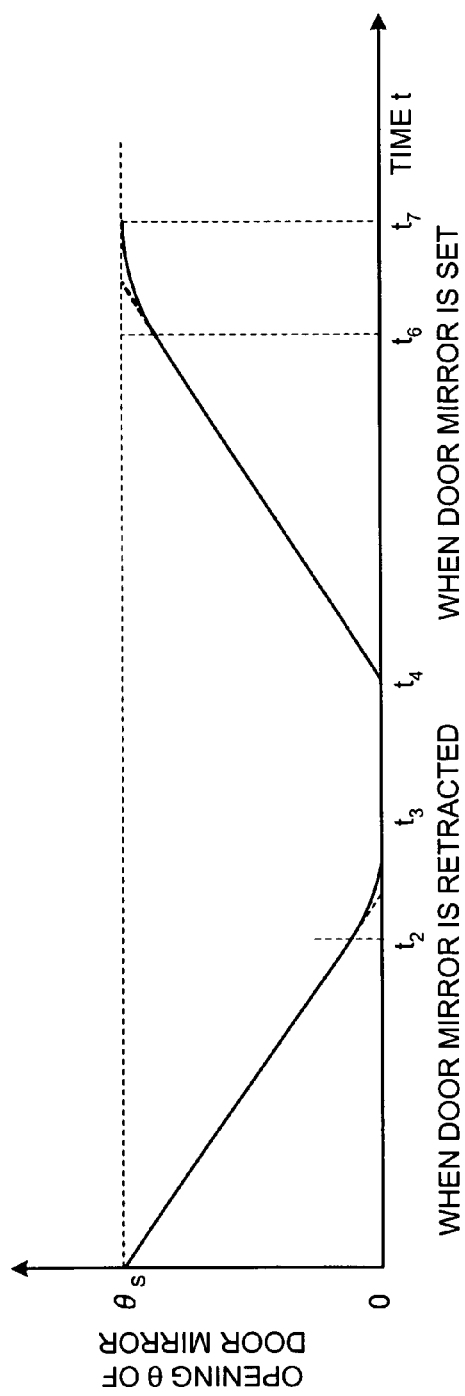

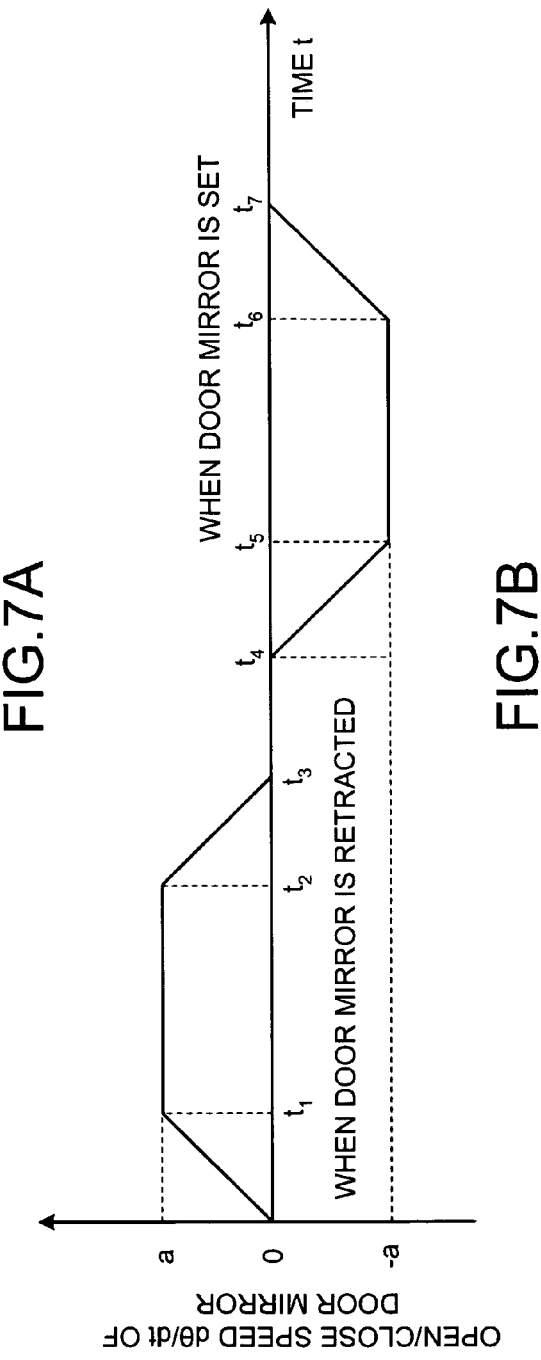
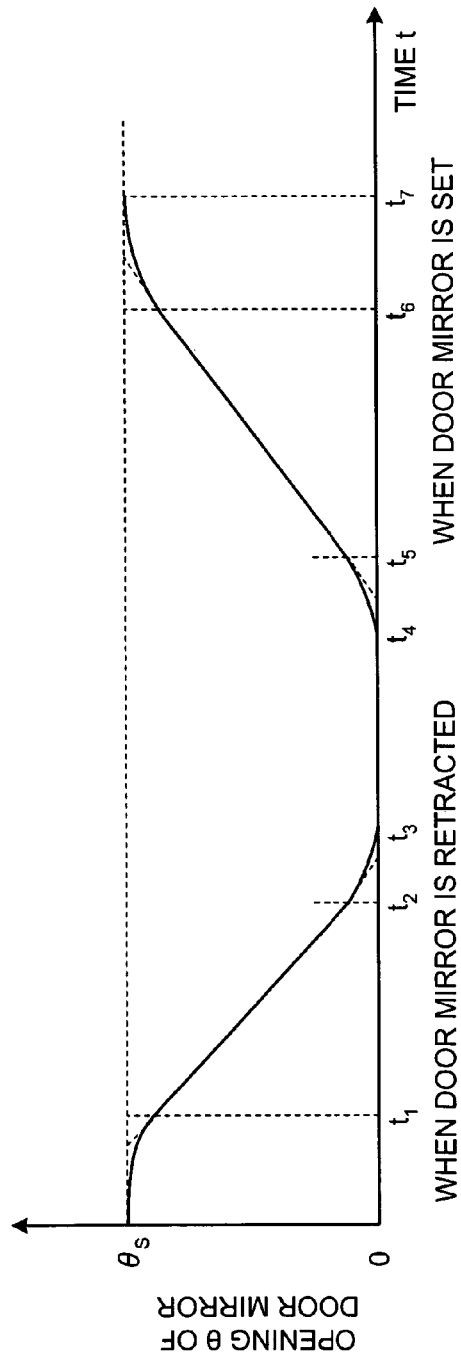

WHEN DOOR MIRROR IS RETRACTED

WHEN DOOR MIRROR IS RETRACTED

OPENING θ OF DOOR MIRROR
(WHEN DOOR MIRROR IS RETRACTED)

OPENING θ OF DOOR MIRROR
(WHEN DOOR MIRROR IS RETRACTED)

VEHICLE DOOR MIRROR WITH PULSE MODULATION CONTROL

CROSS-REFERENCE TO RELATED APPLICATIONS

The present document incorporates by reference the entire contents of Japanese priority documents, 2005-121613 filed in Japan on Apr. 19, 2005 and 2005-367469 filed in Japan on Dec. 21, 2005.

BACKGROUND OF THE INVENTION

1. Field of the Invention

The present invention relates to a vehicle door mirror, and more particularly, to a vehicle door mirror capable of improving looking impression in retracting and setting operation.

2. Description of the Related Art

Recently, car users have higher needs for high-quality impression of cars. Therefore, improved looking impression of a vehicle door mirror is also strongly required.

A conventional vehicle door mirror is described in, for example, Japanese Patent Application Laid-Open No. 2004-182037. A driving unit of the conventional vehicle door mirror includes a first drive mechanism for pivoting a first mirror body mounted on the left side of a vehicle between a use (set) position and a storage (retracted) position, and a second drive mechanism for pivoting a second mirror body mounted on the right side of the vehicle between the set position and the retracted position. The driving unit further includes a pivot restricting unit for restricting pivotal movement of each of the first and the second mirror bodies not to be beyond the set position and the retracted position, respectively, a driving interrupting unit, and an open (setting)/close (retracting) controller. The driving interrupting unit connects a first drive motor and a second drive motor in parallel to a driving circuit, and interrupts driving of the first drive motor and the second drive motor by putting the driving circuit into the open state upon pivoting operation of the first mirror body and the second mirror body. The first drive motor is a drive source for the first drive mechanism, the second drive motor is a drive source for the second drive mechanism, and the driving circuit passes a drive current through the first drive motor and the second drive motor. The open/close controller stops the first drive motor and the second drive motor in such a manner that the driving interrupting unit puts the driving circuit into the open state, when a total value of the drive currents passing through both the drive motors becomes a reference value.

However, in the conventional vehicle door mirror, an improvement of the looking impression of the door mirror when retracting and setting the door mirror is not considered, which is a current need for high-quality impression of the vehicle.

SUMMARY OF THE INVENTION

It is an object of the present invention to at least partially solve the problems in the conventional technology.

A vehicle door mirror according to one aspect of the present invention is configured to be mounted on outside of a vehicle in a retractable manner from a set position to a retracted position. When moving to the set position or the retracted position, the vehicle door mirror is moved at a first speed from a start position to a position right before a stop position, and is further moved from the position right before the stop position to the stop position at a second speed that is slower than the first speed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 to 6B are diagrams for explaining a function of the vehicle door mirror shown in FIG. 1; and FIGS. 7A to 18 are diagrams for explaining modifications of the vehicle door mirror shown in FIG. 1.

DETAILED DESCRIPTION OF THE PREFERRED EMBODIMENTS

Exemplary embodiments of the present invention are explained in detail below with reference to the accompanying drawings. It should be noted that the present invention is not limited by the embodiments. Furthermore, components of the embodiments include those which are easily replaceable by persons skilled in the art or those which are substantially the same. A plurality of modifications described in the embodiments can arbitrarily be combined within a scope that is obvious to persons skilled in the art.

Figure 1:
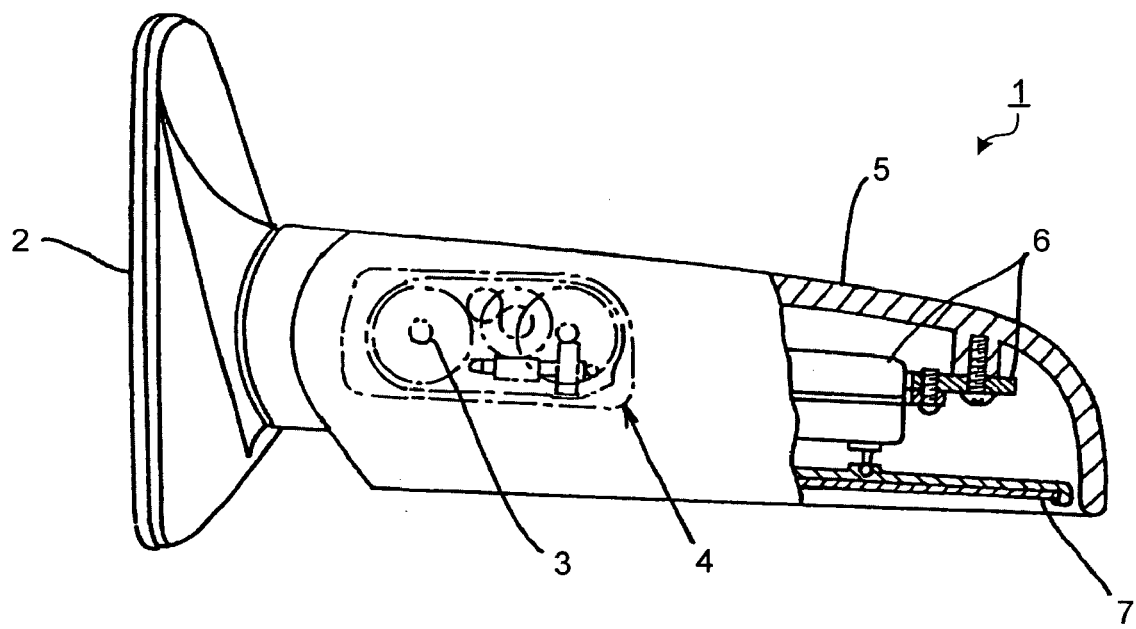
FIG. 1 is a diagram of a vehicle door mirror according to the present invention.
Figure 2:
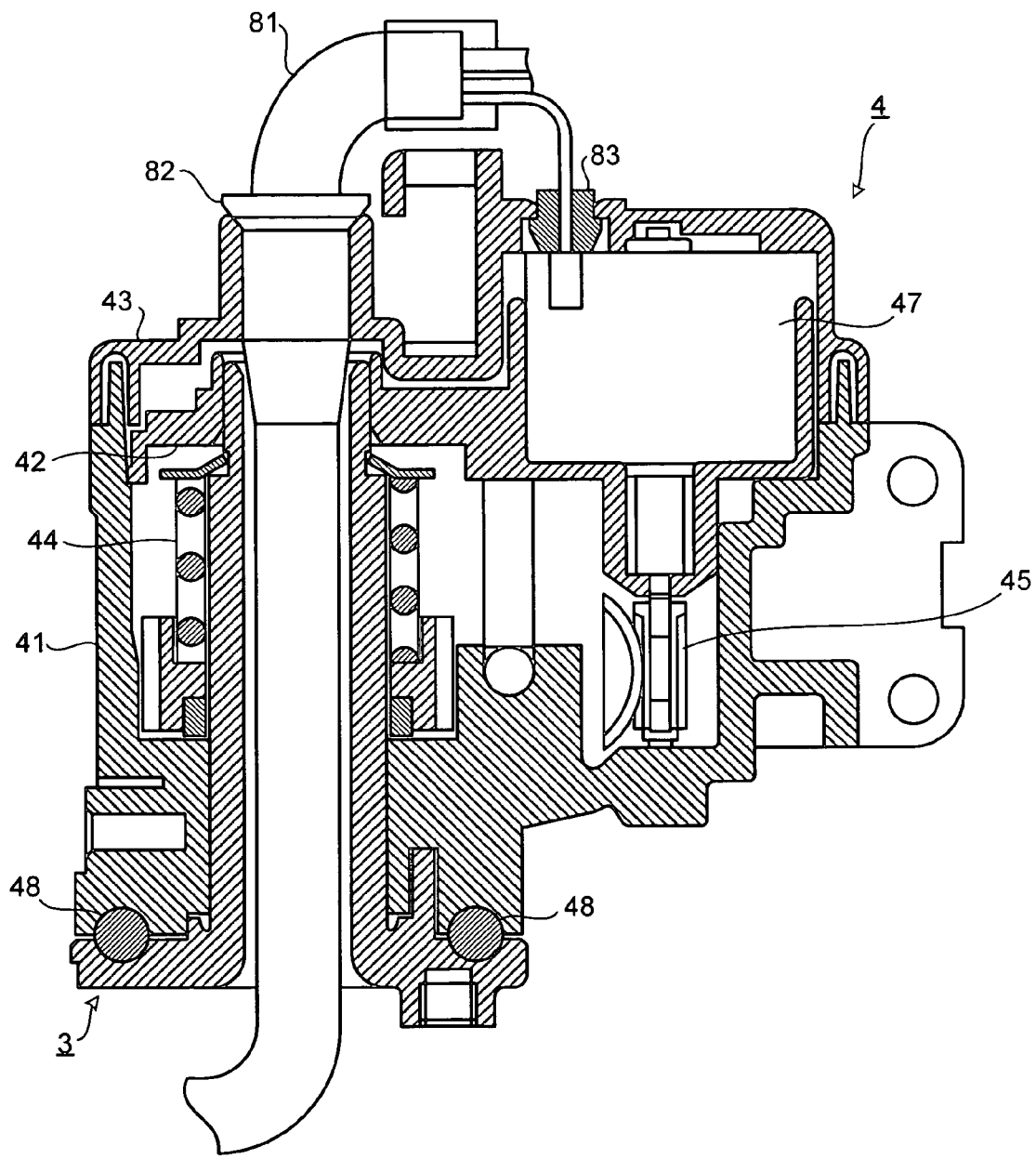
FIG. 2 is a cross-section of a driving unit of the vehicle door mirror shown in FIG. 1.
Figure 3A:
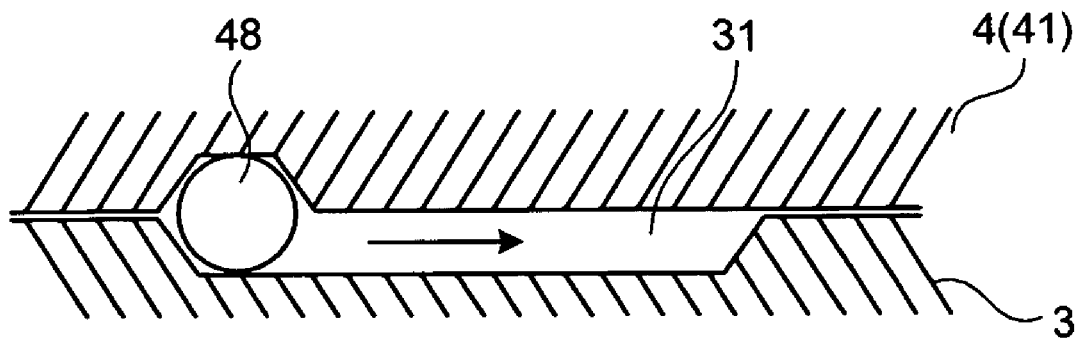
FIGS. 3A and 3B are diagrams for explaining how the driving unit of the vehicle door mirror shown in FIG. 1 operates.
Figure 3B:
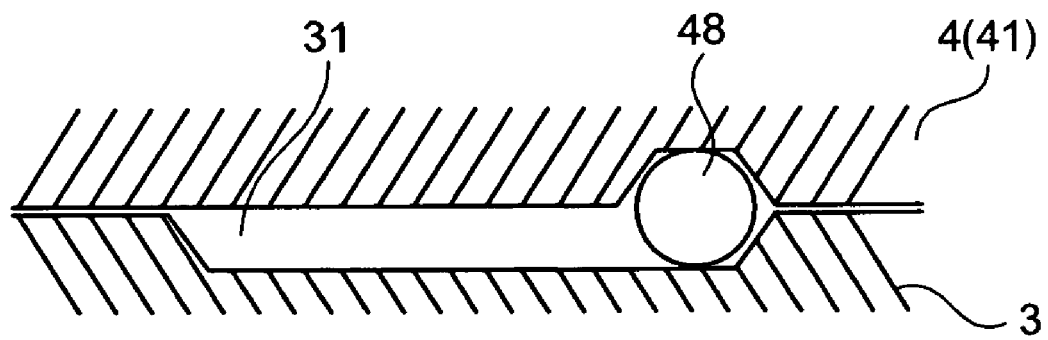

FIG. 1 is a diagram of a vehicle door mirror according to the present invention. FIG. 2 is a cross-section of a driving unit of the vehicle door mirror of FIG. 1, and FIGS. 3A and 3B are diagrams for explaining how the driving unit operates. FIGS. 4 to 6B are diagrams for explaining a function of the vehicle door mirror of FIG. 1. FIGS. 7A to 18 are diagrams for explaining modifications of the vehicle door mirror of FIG. 1.

A vehicle door mirror 1 is an electrically retracting door mirror such that a pair of left and right door mirrors is provided as a set, and one of them is mounted on the door of a driver side of a vehicle and the other is mounted on the door of a passenger side thereof. The vehicle door mirror 1 includes a base 2, a shaft 3, a driving unit 4, a housing 5, a fixing bracket (power unit, etc.) 6, and a mirror 7 (see FIG. 1).

The base 2 is fixed to the door of the vehicle (not shown). The shaft 3 is fixed upright to the base 2. The driving unit 4 is supported to be pivotable around the shaft 3 (it is supported so that the shaft 3 becomes a pivoting shaft). The housing 5, the fixing bracket 6, and the mirror 7 form a mirror assembly (door mirror), which is pivotably supported on the shaft 3 through the driving unit 4.

The driving unit 4 includes a gear case 41, a plate 42, a cover 43, a clutch mechanism 44, a deceleration mechanism 45, and a motor 47 (see FIG. 2). The gear case 41 is a case for accommodating the clutch mechanism 44 and the deceleration mechanism 45, and is supported pivotably with respect to the shaft 3. A ball 48 (or notch) is disposed between the gear case 41 and a holder (flange-like part) of the shaft 3. The ball 48 is used for smoothing rotation of the gear case 41. The plate 42 is a case for holding the motor 47 and is supported on the shaft 3. The plate 42 is fitted into an opening portion of the gear case 41 to partition an accommodation space for the clutch mechanism 44 and the deceleration mechanism 45. The cover 43 is a waterproof cover and covers the motor 47 fixed to the opening potion of the gear case 41. The clutch mechanism 44 and the deceleration mechanism 45, accommodated in the gear case 41, have a function of transmitting motive energy of the motor 47 to the shaft 3. The motor 47 is held by the plate 42 and is coupled to the clutch mechanism 44 through the deceleration mechanism 45.

In the driving unit 4, the motor 47 is formed with a brushless motor. For example, the motor 47 is formed with a three-phase six-pole direct-current (DC) brushless motor, of which housing integrally includes a control circuit (see FIG. 2). The motor 47 is connected to a control unit (not shown) through a harness 81 and is driven by a drive signal transmitted from the control unit. The control unit is, for example, an electronic control unit (ECU), and is disposed in the vehicle door-mirror 1 (the housing 5) or in the vehicle.

Further, in the driving unit 4, the shaft 3 has a groove 31 formed on the upper surface of its holder along a pivotal direction of the driving unit 4 (the gear case 41) (see FIGS. 2 to 3B). The ball 48 is placed in the groove 31 of the shaft 3 in such a manner that the shaft 3 and the gear case 41 are in their assembled state, and is fitted into the bottom face of the gear case 41 and held thereby. And the ball 48 is positioned at one end of the groove 31 when the door mirror is set (see FIG. 4), and a positional relation between the shaft 3 and the driving unit 4 is fixed through engagement between the ball 48 and the end of the groove 31 (see FIG. 3A). In this manner, the door mirrors are fixed at predetermined angles $\theta_s$ and $\phi_s$, respectively. On the other hand, when the door mirror is to be retracted (see FIG. 5), the ball 48 moves along within the groove 31 by the pivotal movement of the driving unit 4 (open (setting)/close (retracting) operation of the door mirror), and is engaged in the other end of the groove 31 (see FIG. 3B). In this manner, a positional relation between the shaft 3 and the driving unit 4 is fixed, and the door mirrors are fixed to predetermined retracted positions, respectively (retraction angles $\theta=\phi=0$).

The harness 81 is inserted from the vehicle side into the shaft 3 in its axial direction and is connected to the motor 47 through the cover 43 of the driving unit 4 (see FIG. 2). An insertion portion (an area near the front end portion of the shaft 3 and an area near the back-side of the motor 47) between the harness 81 and the cover 43 is sealed by seal materials 82 and 83, respectively.

In the vehicle door mirror 1, when a switch is operated on the vehicle side, the driving unit 4 (the motor 47) is driven by a drive signal from the control unit. More specifically, an input of a pulse signal causes the motor 47 to rotate, and motive energy thereof is transmitted to the shaft 3 through the deceleration mechanism 45 and the clutch mechanism 44. Then, the driving unit 4 is made to pivot around the shaft 3 as a pivoting shaft, to perform the open/close operation of the door mirror.

A detector is disposed in the motor 47, to detect a rotational speed and the number of revolutions of the motor 47 (output shaft). A pulse signal is input to the motor 47 based on the detection results of these, to control openings $\theta$ and $\phi$ of the door mirrors, and also control open/close speeds $d\theta/dt$ and $d\phi/dt$ thereof. When the door mirror is moved to a predetermined position (a set position or a retracted position), the driving unit 4 stops the input of the drive signal to terminate the motor 47. This causes positions of the door mirrors ($\theta$, $\phi$) to be set to predetermined set angles $\theta=\theta_s$, $\phi=\phi_s$, or to retraction angles $\theta=\phi=0$, respectively (see FIGS. 4 and 5).

In the vehicle door mirror 1, the position of the door mirror ($\theta$, $\phi$ and $d\theta/dt$, $d\phi/dt$) is controlled to that as follows upon set and retraction of the door mirror (see FIGS. 6A and 6B). The position control of the door mirror is explained below using the open/close operation of a driver side door mirror as one example (see FIGS. 4 to 6B).

The driver side door mirror is set so that the opening (set angle) upon its being set becomes $\theta=\theta_s$ and the opening (retracted angle) upon its being retracted becomes $\theta=0$. When the door mirror is to be retracted, at first, the door mirror moves from the set position to a position before (immediately before) the retracted position at a predetermined (normal) operation speed (close operation) ($t=0$ to $t_2$). According to the present embodiment, the open/close speed $d\theta/dt$ of the door mirror at this time is constant ($d\theta/dt=a$). Then, the door mirror moves from the position before the retracted position to the retracted position at the open/close speed $d\theta/dt$ that is lower than the previous open/close speed $d\theta/dt$, and stops at the retracted position ($t=t_2$ to $t_3$). The open/close speed $d\theta/dt$ of the door mirror is configured to be gradually reduced from the position before the stop position (retracted position).

In this configuration, the door mirror moves from the position before the retracted position to the retracted position at the lower open/close speed $d\theta/dt$, and therefore, impact sound, between the ball 48 and the shaft 3 (the end of the groove 31) produced when the door mirror is stopped to pivot, is reduced (see FIGS. 3A and 3B). This allows improvement of the impression of the door mirror related to the open/close operation. Furthermore, because impact force between the ball 48 and the shaft 3 is reduced, this allows improvement of structural durability (particularly, the durability of a gear portion) of the driving unit 4. Therefore, the driving unit 4 can be formed with low-cost parts (materials), which allows cost reduction of products.

On the other hand, when the door mirror is to be set, conversely to the retraction case, the door mirror moves from the retracted position to a position before the set position at the predetermined operation speed (open operation) ($t=t_4$ to $t_6$). According to the present embodiment, an open/close speed $d\theta/dt$ of the door mirror at this time is constant ($d\theta/dt=a$). Then, the door mirror moves from the position before the set position to the set position at an open/close speed $d\theta/dt$ which is lower (slower) than the previous open/close speed $d\theta/dt$, and stops at the set position ($t=t_6$ to $t_7$) More specifically, the open/close speed $d\theta/dt$ of the door mirror is configured to be gradually reduced from the position before the stop position (set position).

In this configuration, similarly to the case where the door mirror is retracted, the impact sound, between the ball 48 and the shaft 3 produced when the door mirror is stopped to pivot, is reduced. This allows improvement of the impression of the door mirror related to the open/close operation. Furthermore, because the impact force between the ball 48 and the shaft 3 is reduced, this allows improvement of structural durability (particularly, the durability of the gear portion) of the driving unit 4. Therefore, the driving unit 4 can be formed with low-cost parts (materials), which allows cost reduction of products.

In the configuration in which the open/close operation (retracting operation or setting operation) of the door mirror is stopped while the open/close speed of the door mirror is gradually reduced (see FIGS. 6A and 6B), the impact sound between the ball 48 and the shaft 3 upon stopping of the door mirror ($t=t_2$ to $t_3$, $t=t_6$ to $t_7$) is further reduced. This allows improvement of the impression of the door mirror related to the open/close operation. Furthermore, in this configuration, the door mirror smoothly and moderately stops its open/close operation (see FIG. 6B), thus, further improving the impression of the door mirror related to the open/close operation.

Upon stopping of the door mirror, the ball 48 of the driving unit 4 and the groove 31 of the shaft 3 hit each other in the above manner, the rotation of the motor 47 is thereby forcefully terminated. At this time, the open/close operation of the door mirror is stopped while the open/close speed is gradually reduced (see FIG. 6B), and torque produced upon stopping of the motor 47 is thereby reduced. This allows effective reduction in occurrence of vibrations upon stopping of the door mirror.

According to a first modification of the vehicle door mirror 1, it is preferable to start the open/close operation of the door mirror while the open/close speed dθ/dt is gradually increased (see FIGS. 7A and 7B). More specifically, the door mirror is preferably started so that the open/close speed dθ/dt of the door mirror is gradually increased upon starting of retraction (t=0 to $t_1$) or upon starting of setting of the door mirror (t=$t_4$ to $t_5$) (see FIG. 7A). In this configuration, the door mirror is smoothly and moderately started (see FIG. 7B), thus, reducing abnormal noise produced upon starting of the open/close operation. This allows further improvement of the impression of the door mirror related to the open/close operation.

The DC brushless motor has generally very large starting torque as compared with load torque. Therefore, if such a DC brushless motor as above is adopted as a drive source for the door mirror, large vibrations may be produced upon starting of the door mirror. As for this point, in the first modification of the vehicle door mirror 1, the open/close operation of the door mirror is started while the open/close speed dθ/dt is gradually increased (see FIGS. 7A and 7B) in the above manner, thus, effectively reducing noise produced upon starting of the door mirror.

Figure 4:
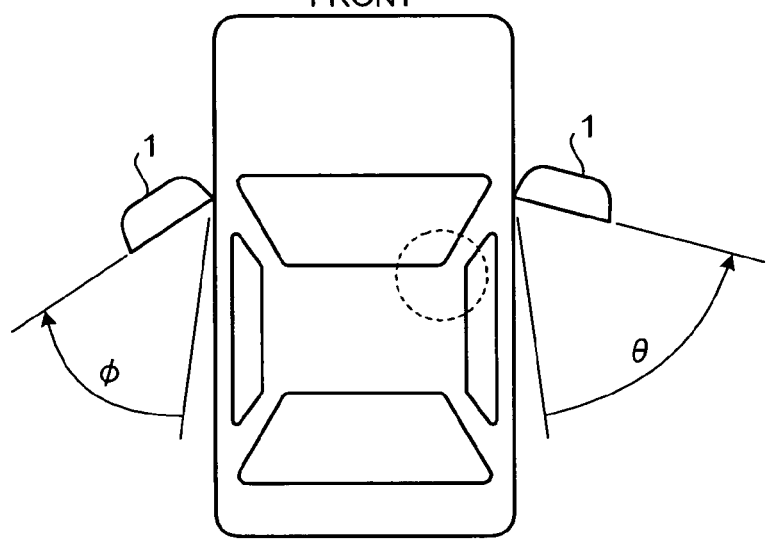
FIG. 4 is a diagram for explaining a function of the vehicle door mirror shown in FIG. 1.
Figure 5:
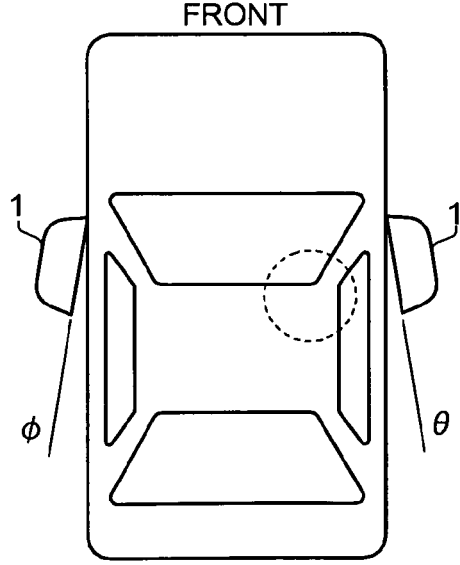
Figure 8A:
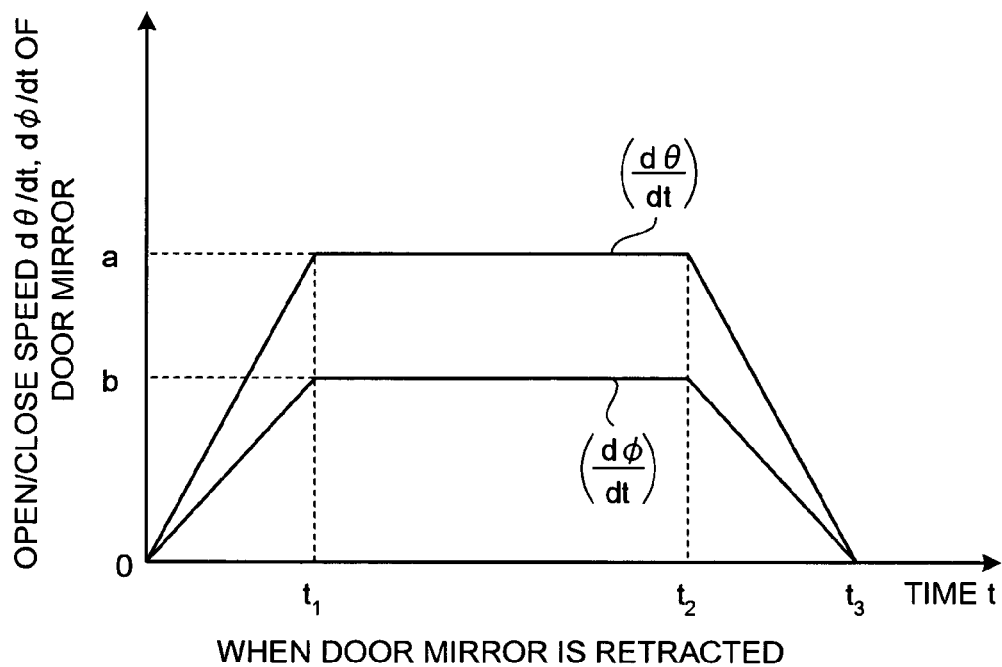
Figure 8B:
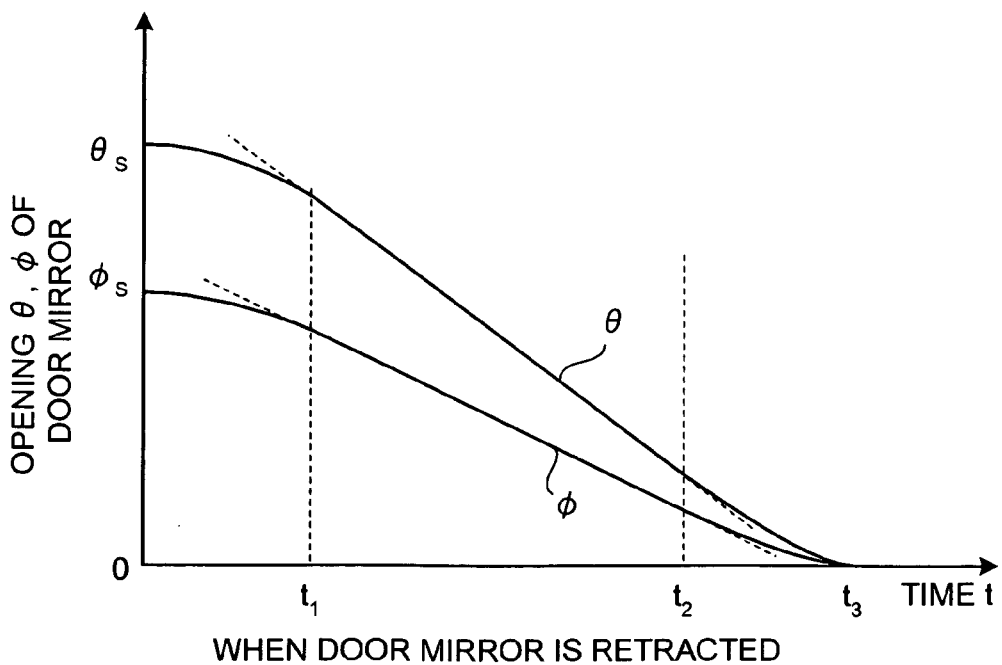

Generally, the set angle θ=$θ_S$ of the door mirror mounted on the driver side is different from the set angle φ=$φ_s$ of the door mirror mounted on the passenger side (see FIG. 4). These set angles $θ_s$ and $φ_s$ are previously specified according to types of vehicles and specifications of products, and the set angle of the driver side door mirror is generally larger ($θ_s$>$φ_s$).

According to a second modification of the vehicle door mirror 1, it is preferable that the open/close operations of the driver side and the passenger side door mirrors are concurrently started and stopped. In other words, when the door mirrors are to be retracted, the driver side and the passenger side door mirrors are concurrently started, moved, and concurrently stopped at the respective retracted positions (see FIGS. 8A and 8B). When the door mirrors are to be set, the driver side and the passenger side door mirrors are concurrently started, moved, and then concurrently stopped at the respective set positions (not shown). Resultantly, the driver side and the passenger side door mirrors are concurrently started and stopped, which allows further improvement of the impression of the door mirrors related to the open/close operations.

For example, when the vehicle door mirrors 1 are symmetrically mounted on the doors of the driver side and the passenger side of a vehicle and have the same components as each other, the set angles θ=$θ_s$ and φ=$φ_s$ of the door mirrors are different from each other. Therefore, the number of revolutions of the motor 47 and that of the motor 47 for retracting or setting the door mirrors are different between the driving units 4. Consequently, in this configuration, the position control of the door mirror is performed so that the open/close speed dθ/dt (rotational speed of the motor 47) of the driver side door mirror is set higher, to cause the door mirrors to concurrently start and stop (see FIGS. 8A and 8B).

In the configuration such that the open/close operation of the door mirror is stopped while the open/close speed dθ/dt is gradually reduced (see FIGS. 6A to 7B), the motor 47 is, in general, stopped while the rotational speed V is gradually reduced according to the open/close speed dθ/dt of the door mirror. In such a configuration, however, the torque of the motor 47 is short, so that the door mirror may not pivot up to a predetermined stop position (set position θ=$θ_s$ or retracted position θ=0). Alternatively, the door mirror may not be sufficiently tightened at the stop position, to cause play to occur in the gear of the driving unit 4, which may lead to occurrence of rattle of the door mirror.

Figure 9:
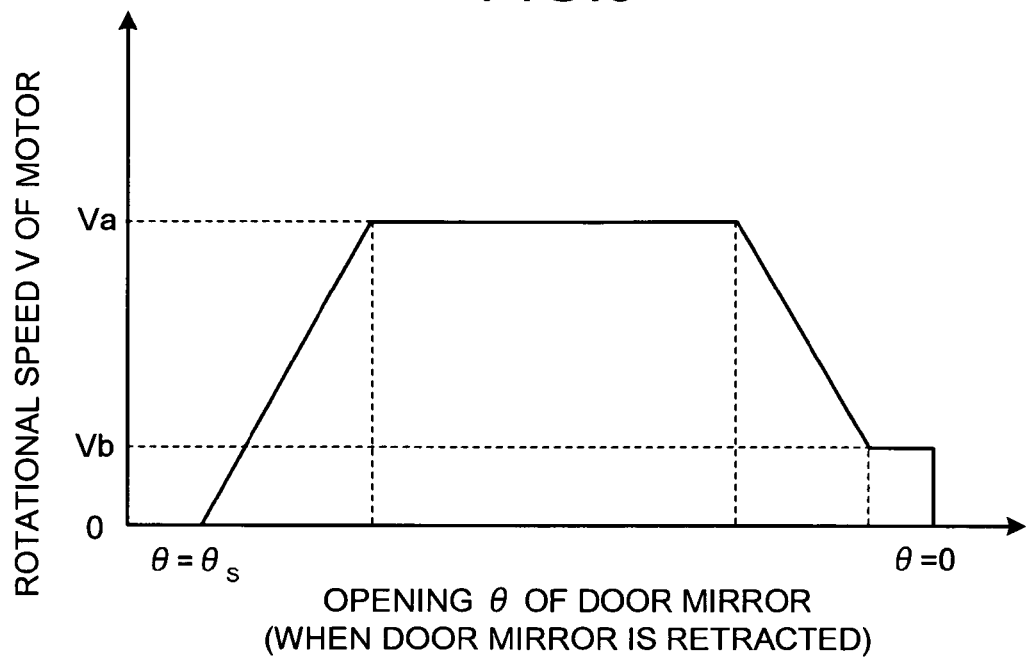
Figure 10:
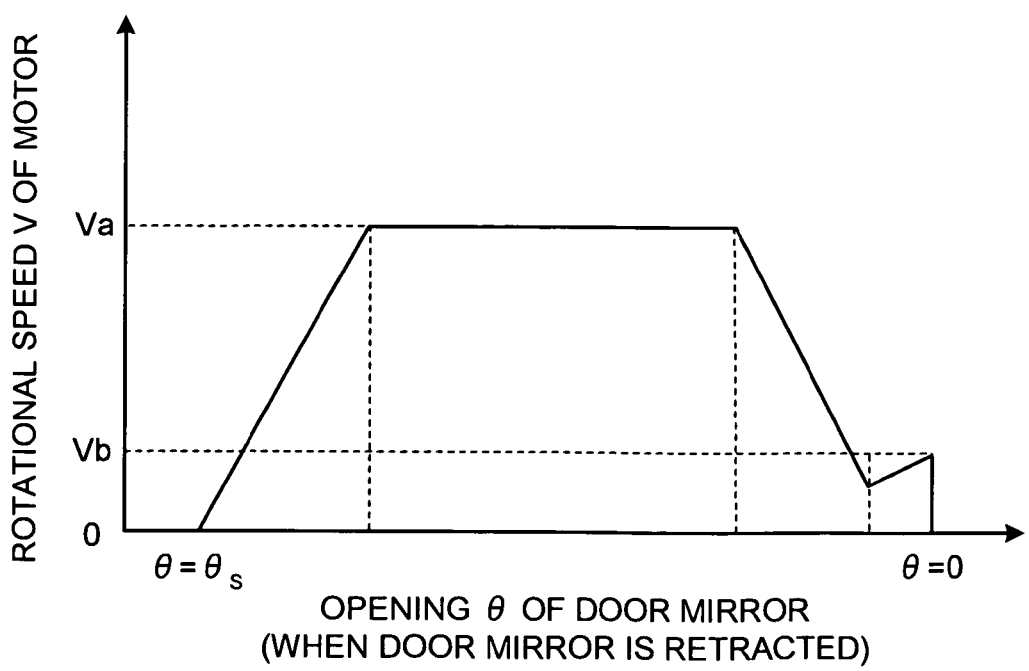
Figure 11:
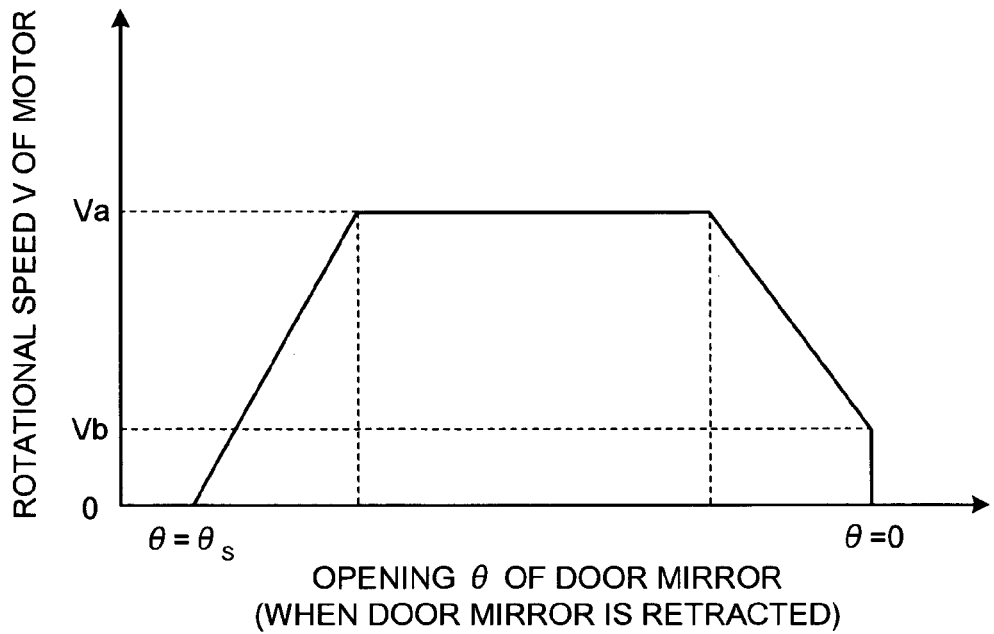

According to a third modification of the vehicle door mirror 1, upon stopping (right before the stopping) of the open/close operation of the door mirror, the motor 47 for driving the door mirror is preferably driven at a predetermined tightening speed $V_b$ required for causing the door mirror to pivot up to the predetermined stop position (see FIGS. 9 to 11). Namely, the door mirror is driven as far as the stop position of the open/close operation at the predetermined tightening speed $V_b$. In other words, when the open/close operation of the door mirror is to be stopped, it is preferable that a driving voltage of the motor 47 is specified so that the motor 47 has predetermined tightening torque required for causing the door mirror to pivot up to the predetermined stop position. This allows the door mirror to be appropriately tightened and to reliably stop at a predetermined set position or retracted position. The tightening speed $V_b$ of the motor 47 is selected as required so that the impact sound (impact sound between the ball 48 of the driving unit 4 and the end of the groove 31 of the shaft 3 (see FIGS. 3A and 3B)) falls within an allowable range upon stopping of the door mirror.

In the example shown in FIG. 9, upon retraction of the door mirror, the motor 47 is driven at a fixed rotational speed V=$V_a$ before the door mirror reaches the predetermined opening θ. Then, the rotational speed V of the motor 47 is gradually reduced when the open/close operation of the door mirror is stopped (up to a position right before the stop position of the door mirror). The open/close speed dθ/dt of the door mirror is thereby made gradually slower, which allows the impression (high-quality impression) of the door mirror to be improved. Then, the motor 47 is driven at a fixed tightening speed $V_b$ from a position right before the stop position to the stop position (θ=0) of the door mirror. The door mirror is thereby made to pivot up to the predetermined stop position and is tightened therein. A time during which the motor 47 is driven at the tightening speed $V_b$ is specified to a range as required for the high-quality impression, due to the operations of the door mirrors in the above manner, which is given to those who see the door mirrors.

On the other hand, in an example shown in FIG. 10, after the motor 47 gradually reduces the rotational speed V when the open/close operation of the door mirror is stopped, the rotational speed V is increased again from a position right before the stop position of the door mirror. Then, control is provided so that the motor 47 becomes a predetermined tightening speed $V_b$ at the stop position of the door mirror. The door mirror is thereby tightened appropriately. In this configuration, the open/close speed dθ/dt (rotational speed V of the motor 47) of the door mirror at a position right before stopping is changed in a V-shape, as compared with an example of FIG. 12, which is explained later. Therefore, this configuration is preferable in terms of moderate change in speed.

Furthermore, in the example shown in FIG. 11, the rotational speed of the motor is controlled so that the motor 47 gradually reduces the rotational speed V when the open/close operation of the door mirror is stopped and the door mirror reaches the stop position when the rotational speed V of the motor 47 reaches the predetermined tightening speed $V_b$. In other words, the motor 47 is driven at least at the predetermined tightening speed $V_b$ before the door mirror reaches the stop position of the open/close operation. This allows the door mirror to be appropriately tightened.

Figure 12:
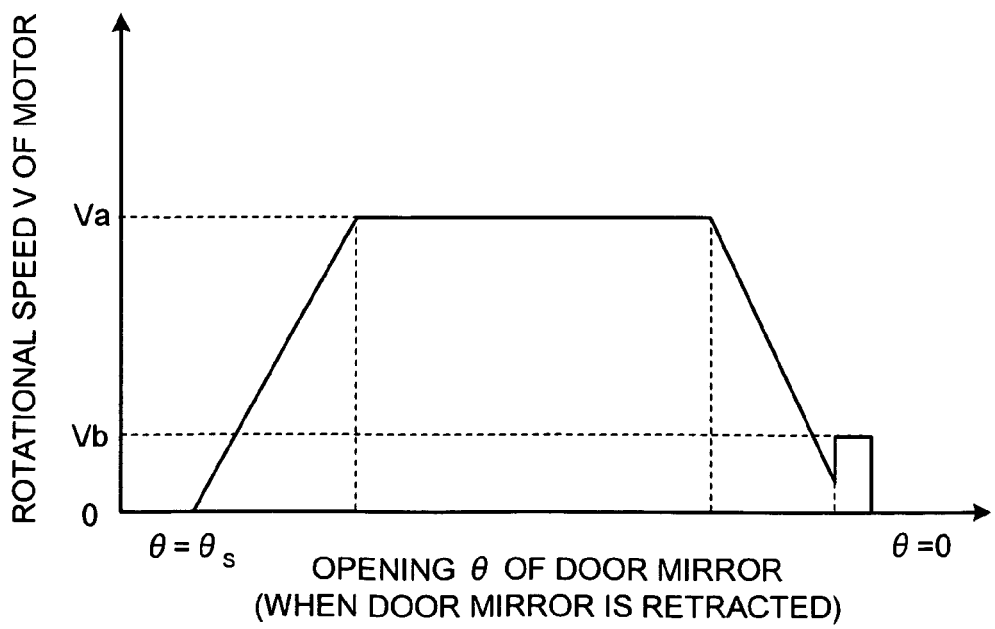

In the example shown in FIG. 12, the motor 47 gradually reduces the rotational speed V when the open/close operation of the door mirror is stopped, and the motor 47 increases again the rotational speed V at a position right before the opening θ of the door mirror is θ=0. At this time, the motor 47 increases the rotational speed V up to the predetermined tightening speed $V_b$ at one step. In other words, the rotational speed V of the motor 47 is maintained to a fixed predetermined tightening speed $V_b$ at a position right before the stopping of the door mirror. Therefore, this configuration is preferable in terms of stable tightening of the door mirror, as compared with the example of FIG. 10.

The configuration, in which the door mirror is tightened in the above manner, may cause a case where the start of movement of the door mirror will not be performed smoothly upon next start of the open/close operation of the door mirror. More specifically, the door mirror is tightened upon stopping of the previous open/close operation, and therefore, even if the motor 47 is driven at a low rotational speed V (driving voltage) when the next open/close operation is started, the door mirror cannot be started because of strong tightening force, or a wasteful time before starting may be increased.

Figure 14:
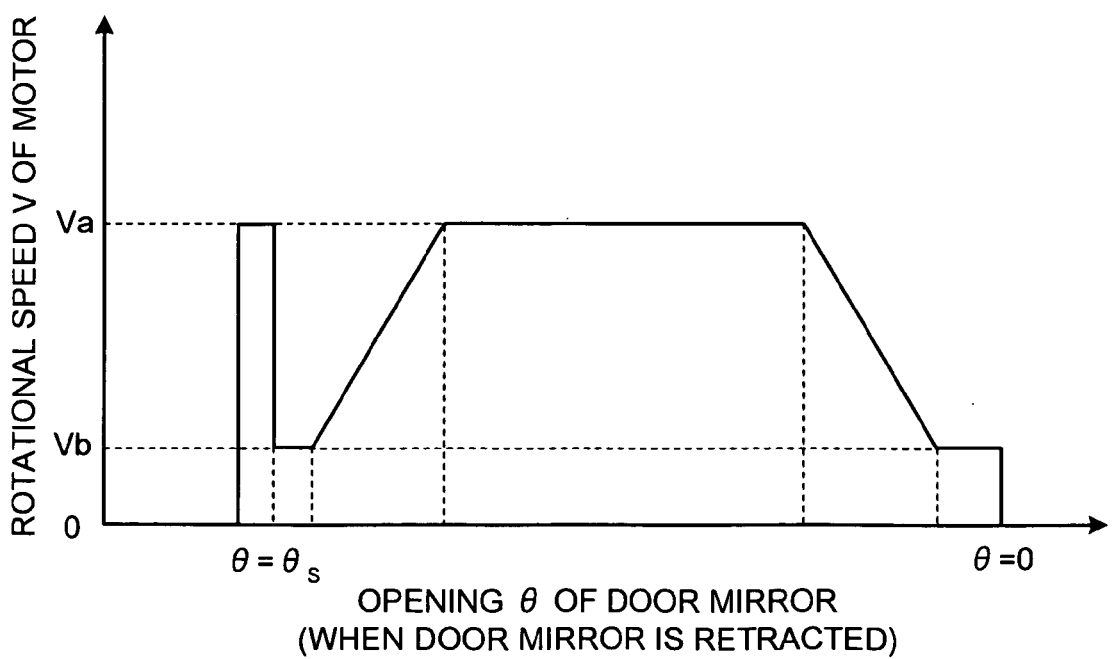

It is preferable in the configuration that the motor 47 is driven by being applied with a predetermined starting voltage upon starting of the open/close operation of the door mirror (see FIG. 14). The starting voltage stands for a driving voltage to be applied to the motor 47 for smoothly starting the movement of the door mirror, and is, for example, a voltage higher than a voltage required for providing the tightening speed $V_b$ to the motor 47. Such a configuration as explained above allows smooth starting of the door mirror upon the start of the open/close operation thereof.

Figure 13:
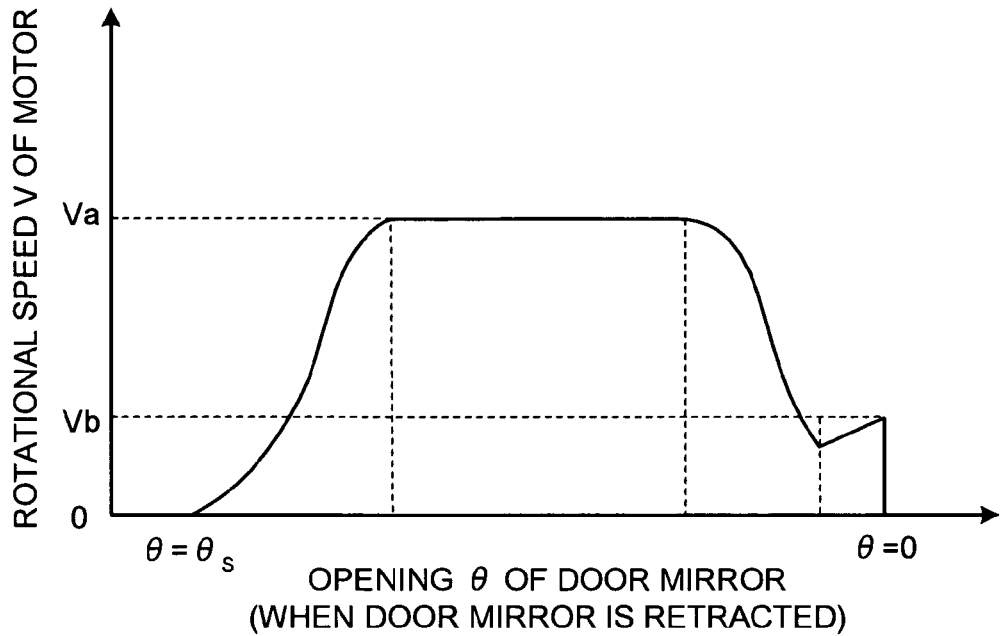

In the example of FIG. 13, a predetermined rotational speed V is provided to the motor 47 using the starting voltage. The rotational speed V is, for example, a rotational speed $V_a$ during the open/close operation, which is higher than the rotational speed upon the start of the open/close operation. In the configuration, at first, the starting voltage is applied to the motor 47, and the motor 47 is thereby started at the rotational speed $V_a$. Then, the starting voltage is switched to a predetermined low driving voltage in a short time, and the motor 47 is driven at a lower rotational speed V (e.g., tightening speed $V_b$). Thereafter, the motor 47 gradually increases the rotational speed V, so that the open/close operation of the door mirror is smoothly started. This configuration allows smooth starting of the door mirror by the starting voltage. Furthermore, the starting voltage is switched to a lower driving voltage in a short time, which allows reduction of rattle of the door mirror upon the start of open/close operation.

The function (open/close operation of the door mirror) of the motor 47 when the door mirror is retracted is explained, but the function of the motor 47 when the door mirror is set is also configured in the same manner as above.

Figure 15:
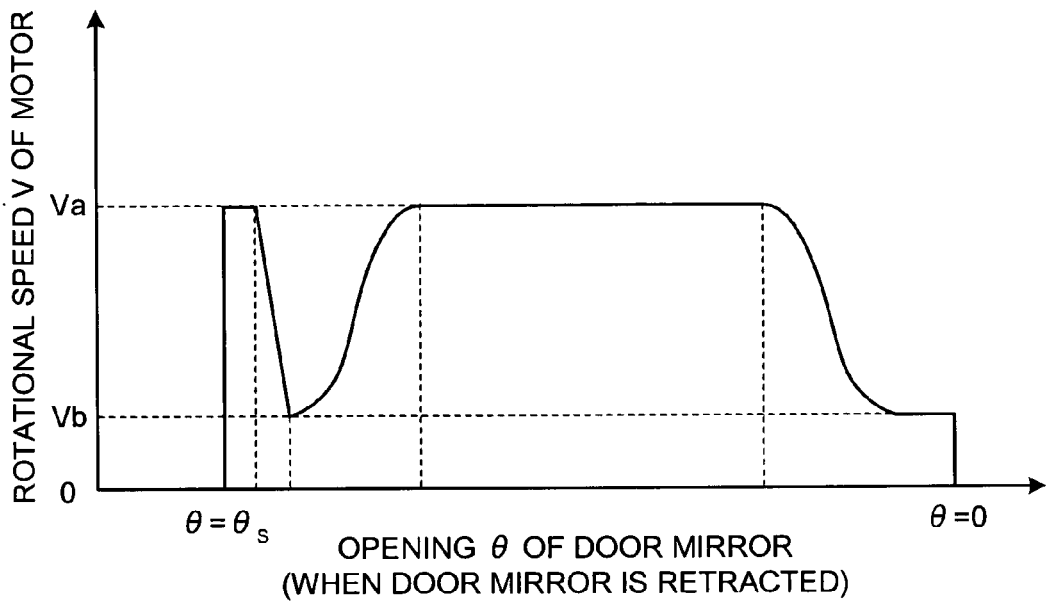

The relation between the rotational speed V of the motor 47 and the opening θ of the door mirror upon stopping (or starting) of the open/close operation of the door mirror is not limited to a primary expression, but may be specified by a high-order expression (see FIGS. 13 and 15).

When the rotational speed V of the motor 47 is switched to a predetermined low rotational speed V upon the start of the motor 47, the following configurations may be adopted. One of them is such that the driving voltage of the motor 47 is immediately reduced and the rotational speed V is switched (see FIG. 14), and another one of them is such that the driving voltage is gradually reduced and the rotational speed V is smoothly reduced (see FIG. 15).

Figure 16:
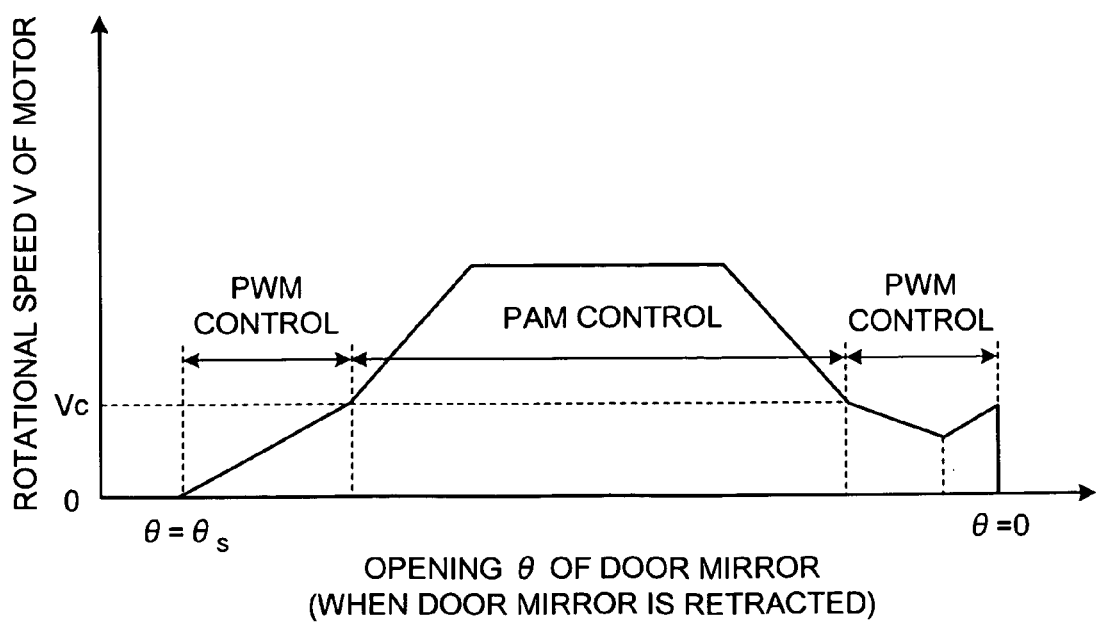
Figure 17:
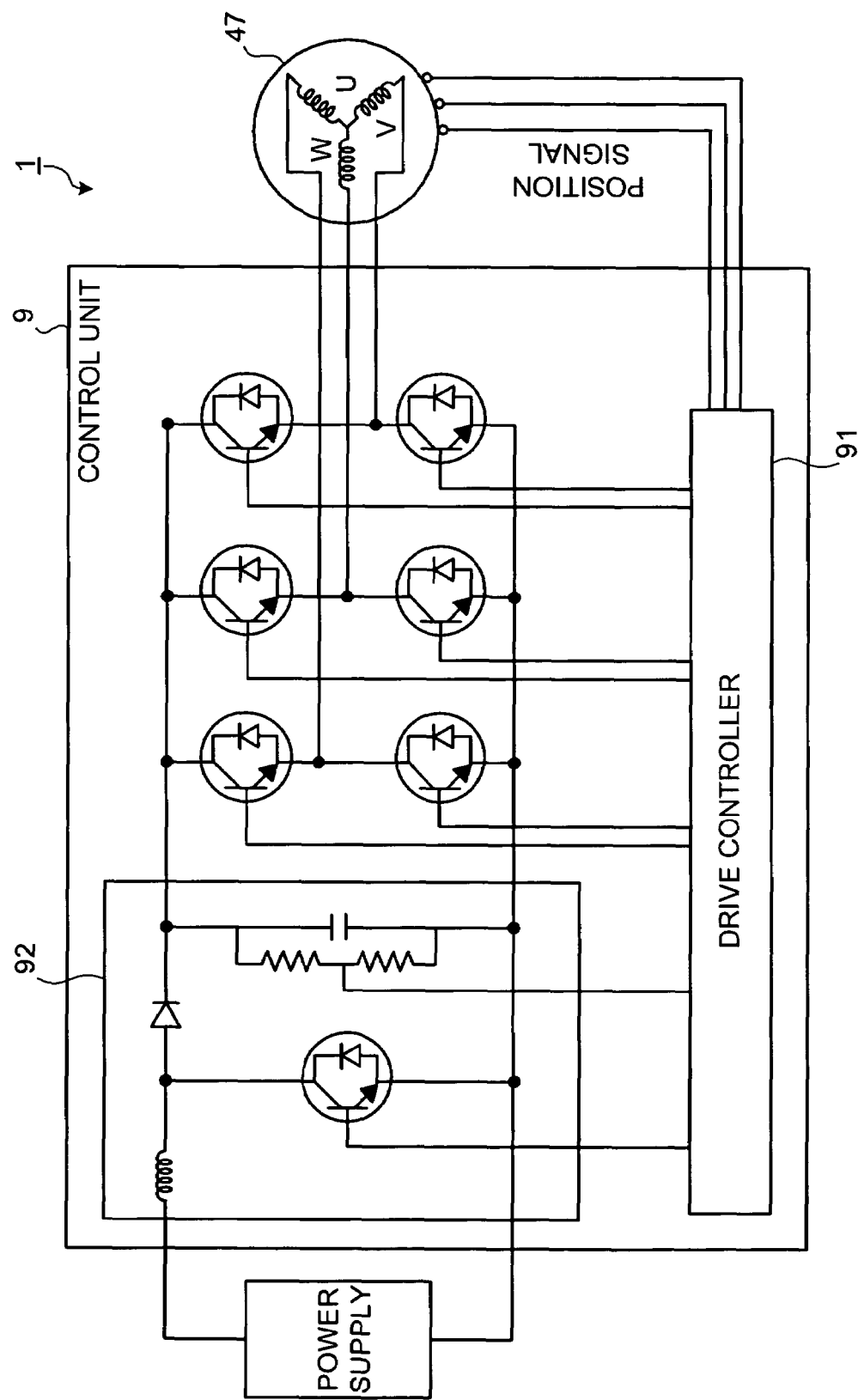
Figure 18:
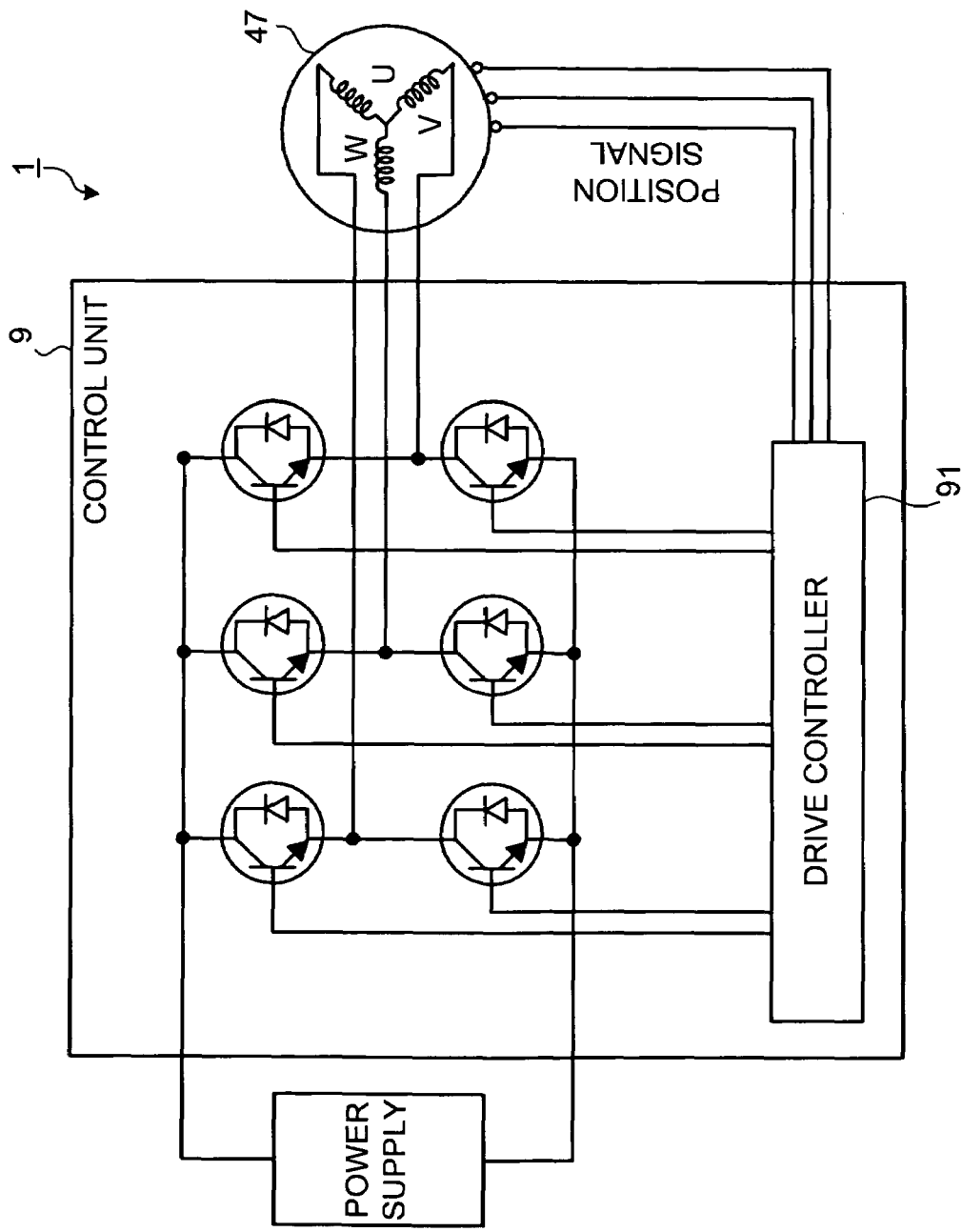

According to a fourth modification of the vehicle door mirror 1, the speed of the motor 47 may be controlled under pulse width modulation (PWM) control or under pulse amplitude modulation (PAM) control, or by combination thereof (see FIGS. 16 to 18). In the PWM control, a driving period of the motor 47 is intermittently turned on/off to change an energizing ratio of the motor 47, and an effective voltage to be supplied to the motor 47 is thereby controlled. This allows control of the rotational speed V of the motor 47. On the other hand, in the PAM control, the driving voltage level of the motor 47 is adjusted (rise or drop), to control the rotational speed V of the motor 47. The rotational speed V of the motor 47 can be controlled using a fixed supply voltage under the PWM control or the PAM control.

For example, in the configuration in which the speed of the motor 47 is controlled by the combination of the PWM control and the PAM control, a control unit 9 shown in FIG. 17 is adopted. The control unit 9 includes a drive controller 91 that controls the drive of the motor 47, a field effect transistor (FET) circuit that forms drive switches of the motor 47, and a PAM circuit 92 used for PAM control. The FET circuit has six conducting elements arranged in a totem pole structure. These conducting elements are connected to a power supply, and are connected to U phase, V phase, and W phase of the motor 47, respectively. In the FET circuit, a conducting timing of the conducting elements is changed to modulate a pulse width of a supply voltage to the motor 47, and the motor 47 is thereby driven (PWM control). The PAM circuit 92 includes an inductance and a diode which are serially connected to the power supply, and also includes a capacitor connected in parallel thereto. In the PAM circuit 92, a current energy is stored in the inductance in response to turning on of the FET circuit, and a high voltage produced is stored in the capacitor through the diode in response to turning off of the FET circuit. A voltage stored in the capacitor is adjusted by an on/off ratio of the FET circuit or change of frequency. The voltage stored is supplied to the FET circuit, and the motor 47 is thereby driven by a voltage higher than the supply voltage (PAM control).

In the control unit 9, the detector installed in the motor 47 detects a position signal of a rotor (signal related to a magnet position of a rotor) of the motor 47, and the drive controller 91 acquires the position signal. The drive controller 91 selects a conducting element of the FET circuit and decides a conducting timing based on the position signal, and controls the drive of the motor 47. The number of counts of the position signal (hereinafter, "pivot signal") and the opening θ of the door mirror are in a proportional relation. The drive controller 91 compares the count of the number of pulses of the pivot signal with the number of set pulses previously set, to determine the opening θ of the door mirror. The end time or the start time of the drive control of the motor 47 is determined based on the determination result, and a pulse width of the driving voltage for the motor 47 (timing at which the rotational speed V of the motor 47 is decreased or increased) is selected. The drive controller 91 can determine whether the increase/decrease in the rotational speed V of the motor 47 is stopped based on the count of the number of pulses of the pivot signal or on saturation of the rotational speed V.

The rotational speed V of the motor 47 is controlled in the following manner (see FIG. 16). At first, if the rotational speed V of the motor 47 is lower than a predetermined critical speed $V_c$, a voltage required for driving the motor 47 is low, and hence, the motor 47 is driven under the PWM control. The drive of the motor 47 in a low voltage range is thereby appropriately controlled. On the other hand, if the rotational speed V of the motor 47 is higher than the predetermined critical speed $V_c$, a voltage required for driving the motor 47 is high, and hence, the motor 47 is driven under the PAM control. The drive of the motor 47 in a high voltage range is thereby appropriately controlled.

The combination of the PWM control and the PAM control is used in the above configuration, and at the same time, either one of the controls is used according to a driving voltage range of the motor. Therefore, the drive of the motor 47 can be appropriately controlled in a wide voltage range. The critical speed $V_c$ is specified as necessary according to a relation between the rotational speed V of the motor 47 required for the open/close operation of the door mirror and the supply voltage.

For example, when the open/close operation is started or stopped while the open/close speed $d\theta/dt$ of the door mirror is gradually reduced (see FIGS. 6A to 7B), the open/close speed $d\theta/dt$ of the door mirror upon starting or stopping of the open/close operation is slow, and hence, the rotational speed V of the motor 47 is low. Therefore, the supply voltage is used as it is, and the motor 47 is driven under the PWM control. On the other hand, because the open/close speed $d\theta/dt$ of the door mirror is fast in the middle of the open/close operation, the rotational speed V of the motor 47 is high. Therefore, it is preferable that a voltage higher than the supply voltage is used. Resultantly, the motor 47 is driven under the PAM control.

For example, when the speed of the motor 47 is controlled only under the PWM control, the PAM circuit 92 of the control unit 9 shown in FIG. 17 is omitted (see FIG. 18). This configuration allows the rotational speed V of the motor 47 to be controlled.

In the vehicle door mirror 1, because the motor 47 of the driving unit 4 is formed with a brushless motor, some advantages as follows are obtained as compared with a configuration (not shown) in which a motor is formed with a brush motor. The advantages are: (1) vibrations and operation sound when the door mirror is driven are reduced, (2) an electric noise affecting a radio or the like of a vehicle is reduced, and (3) durability of the motor itself is improved. Particularly, these advantages are useful for door mirrors of which high-quality impression is highly required in recent years. Furthermore, another one of the advantages is (4) even if a supply voltage to the motor 47 is changed caused by changes in environment temperature or by degradation of butteries, the drive of the door mirror is stably controlled by drive control of the motor 47, without any effects caused by changes in the supply voltage and changes in ambient temperature.

In the configuration in which the motor of the driving unit is formed with the DC brushless motor, to implement position control of the door mirror, door mirrors having mutually different configurations are adopted for the driver side and the passenger side, respectively. For example, because the use angles $\theta = \theta_s$ and $\phi = \phi_s$ of the door mirrors are different from each other on the driver side and the passenger side, configurations (a gear ratio of the deceleration mechanism 45) of the driving units or supply voltages are made different from each other.

In this respect, in the vehicle door mirror 1, because the motor 47 of the driving unit 4 is a brushless motor, the number of revolutions and the rotational speed thereof can be controlled. Therefore, the positions of the door mirrors (openings $\theta$, $\phi$, and open/close speeds $d\theta/dt$, $d\phi/dt$) can arbitrarily be set with a single configuration. Thus, the driving unit 4 having the same (common) components can be adopted for the doors on both the driver side and the passenger side. Moreover, the driving unit 4 can be driven by the same supply voltage. These advantages allow cost reduction of the products.

According to an embodiment of the present invention, the door mirror moves at a low open/close speed from a position right before a position where pivotal movement is stopped to the position where the pivotal movement is stopped. Therefore, the impact sound produced upon stopping of pivotal movement of the door mirror is reduced, which allows improved impression of the door mirror related to the open/close operation.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle door mirror configured to be mounted on outside of a vehicle in a retractable manner from a set position to a retracted position, wherein when moving to the set position or the retracted position, the vehicle door mirror is moved at a first speed from a start position to a position right before a stop position, and is further moved from the position right before the stop position to the stop position at a second speed that is lower than the first speed, wherein the vehicle door mirror is driven by a motor, and when a rotational speed of the motor is lower than a predetermined critical speed, the motor is driven under a pulse-width-modulation control, and when the rotational speed of the motor is higher than the predetermined critical speed, the motor is driven under a pulse-amplitude-modulation control.

2. The vehicle door mirror according to claim 1, wherein the second speed is gradually reduced to zero from the position right before the stop position to the stop position.

3. A vehicle door mirror configured to be mounted on outside of a vehicle in a retractable manner from a set position to a retracted position, wherein when moving to the set position or the retracted position, the vehicle door mirror is moved at a first speed from a start position to a position right before a stop position, and is further moved from the position right before the stop position to the stop position at a second speed that is lower than the first speed, wherein the second speed is gradually reduced to zero from the position right before the stop position to the stop position, wherein the vehicle door mirror is driven by a motor, and when stopping a movement of the vehicle door mirror, the motor is driven at a predetermined tightening speed required for pivoting the vehicle door mirror up to a predetermined stop position such that the motor has a predetermined tightening torque required for causing the door mirror to pivot up to the predetermined stop position, and wherein when a rotational speed of the motor is lower than a predetermined critical speed, the motor is driver under a pulse-width-modulation control, and when the rotational speed of the motor is higher than the predetermined critical speed, the motor is driven under a pulse-amplitude-modulation control.

4. The vehicle door mirror according to claim 3, wherein the vehicle door mirror starts to move from the start point while gradually increasing a speed of movement to the first speed.

5. The vehicle door mirror according to claim 1, wherein
the vehicle door mirror is mounted on both a driver side and a passenger side, and
movements of the vehicle door mirror on the driver side and the vehicle door mirror on the passenger side start and stop at the same time.

6. The vehicle door mirror according to claim 3, wherein when starting the movement of the vehicle door mirror, the motor is driven with a predetermined starting voltage.

7. A system comprising: a vehicle door mirror configured to be mounted on outside of a vehicle in a retractable manner from a set position to a retracted position; and a controller configured to control movement of the vehicle door mirror such that when moving to the set position or the retracted position, the vehicle door mirror is moved at a first speed from a start position to a position right before a stop position, and is further moved from the position right before the stop position to the stop position at a second speed that is lower than the first speed, wherein the second speed is gradually reduced to zero from the position right before the stop position to the stop position,
wherein the vehicle door mirror is driven by a motor, and when stopping a movement of the vehicle door mirror, the motor is driven at a predetermined tightening speed required for pivoting the vehicle door mirror up to a predetermined stop position such that the motor has a predetermined tightening torque required for causing the door mirror to pivot up to the predetermined stop position, and wherein when a rotational speed of the motor is lower than a predetermined critical speed, the motor is driver under a pulse-width-modulation control, and when the rotational speed of the motor is higher than the predetermined critical speed, the motor is driven under a pulse-amplitude-modulation control.

8. The system of claim 7, wherein the controller is disposed in the vehicle.

* * * * *